Dec. 7, 1943.  L. VON REIS  2,336,200
METHOD OF HARDENING GLASS PLATES AND OTHER GLASS OBJECTS
Filed Nov. 1, 1937  2 Sheets-Sheet 1

Inventor
LAMBERT VON REIS

By Dorsey Cole & Garner
Attorneys

Dec. 7, 1943.  L. VON REIS  2,336,200
METHOD OF HARDENING GLASS PLATES AND OTHER GLASS OBJECTS
Filed Nov. 1, 1937  2 Sheets-Sheet 2
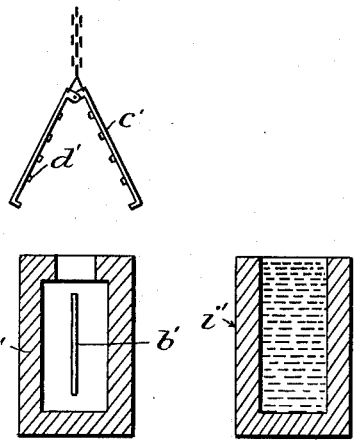
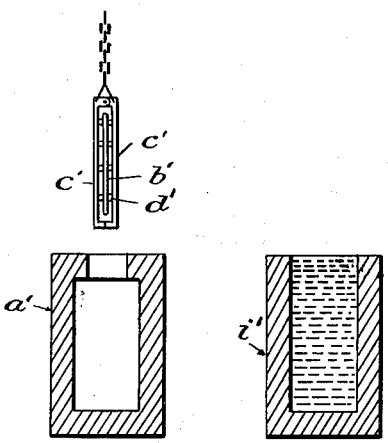
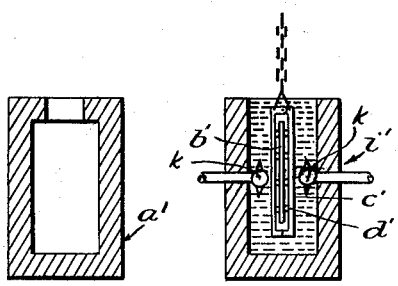
Inventor
LAMBERT VON REIS
By Dorsey Cole & Garner
Attorneys Patented Dec. 7, 1943

2,336,200

UNITED STATES PATENT OFFICE 2,336,200

METHOD OF HARDENING GLASS PLATES AND OTHER GLASS OBJECTS

Lambert von Reis, Stolberg, Germany, assignor to The American Securit Company, Washington, D. C., a corporation of Delaware Application November 1, 1937, Serial No. 172,243
In Germany November 5, 1936

4 Claims. (Cl. 49—89)

The invention relates to hardening glass plate and other glass objects wherein the glass objects, after being heated to a certain degree, are then rapidly chilled while suspended vertically by blowing with gaseous agents. Considerable difficulties have arisen in this method of hardening, particularly with thin glass objects, for example those less than 4.5 to 5 mm. thick, as these slight thicknesses require extremely rapid chilling in order to attain the desired degree of hardness. The necessary operation of carrying off the heat with sufficient rapidity is accomplished by carrying the members carrying the blowing nozzles to the glass to be hardened close to the glass, that is, a few millimeters therefrom. The danger of this method, however, consists in that the glass to be hardened is set in swinging movements by the currents passing from the blowing nozzles, forced toward one or the other blowing members and thereby damaged. There is also danger that the relatively thin glass objects may become distorted in these swinging movements.

The invention relates to a method through which said defects are reliably prevented.

The present invention contemplates a method for precluding the swinging movements of the glass plates or a reduction of such movements to a harmless degree, prior to and during the chilling operation. During the heating and chilling operations it is common practice to suspend the glass plate or other object from gripping tongs. This manner of suspension, without the aid of other means, ordinarily permits the plate to swing. To preclude this swinging movement, the invention contemplates the use of a plurality of stops or lugs which are brought into contact or approximate contact with the surface of the glass plate at a plurality of points.

The present invention further embodies the use of a plurality of stops or lugs so mounted in a frame or grating as to support the glass plate or object. This is particularly advantageous when a liquid chilling medium is utilized, the plate being immersed therein. Since the plate is supported at a plurality of points, the chilling bath may be vigorously agitated to accelerate the chilling without danger of distorting the plate.

The lugs are of such small dimensions as to cover only small surfaces of the glass to be hardened thereby precluding the danger of unequal hardening.

Figures 4, 5 and 6 are views illustrating the successive steps of heating the glass plate, removing the same from the heating furnace and immersing the plate in a liquid chilling bath.

In the present embodiment, when the glass plate is to be chilled in a liquid bath the plate, after being heated, is engaged by the retaining devices and these, together with the plate, are immersed in the bath. The liquid may be given a positive agitation according to a well known principle, in order to accelerate the cooling, or to make it uniform or for any other reason. Since the plate is retained or restrained against any substantial movement, the liquid cooling agent may be energetically applied without risk of the plate deforming through the action of the cooling medium.

The invention also provides for heating the lugs serving to support the glass objects before they come in contact therewith, to a temperature approximating that of the heated glass. This will prevent the heat being carried off from the glass more rapidly from the points of the glass with which the supporting means are in contact than at the other points.

The lugs may be heated by passing the devices provided therewith into the furnace for heating the glass plates, and the lug carrying frame can be engaged with the plate before removing the latter from the furnace.

In furtherance of the invention the stop or lug supports may be constructed as grates or grids, so that the cooling medium and, if necessary, also the heating medium, has an unobstructed passage therethrough to the glass plate.

By carrying the stops or lugs in a perforated frame member or grating the glass plate may be heated or chilled in an inclined or horizontal position as well as a vertical.

In addition to precluding or limiting the swinging movements of the glass objects, the lug supports may also serve to retain the objects in the desired position during the heating and/or cooling, so that other retaining means, such as suspending tongs, forks, etc., are unnecessary.

Figure 1:
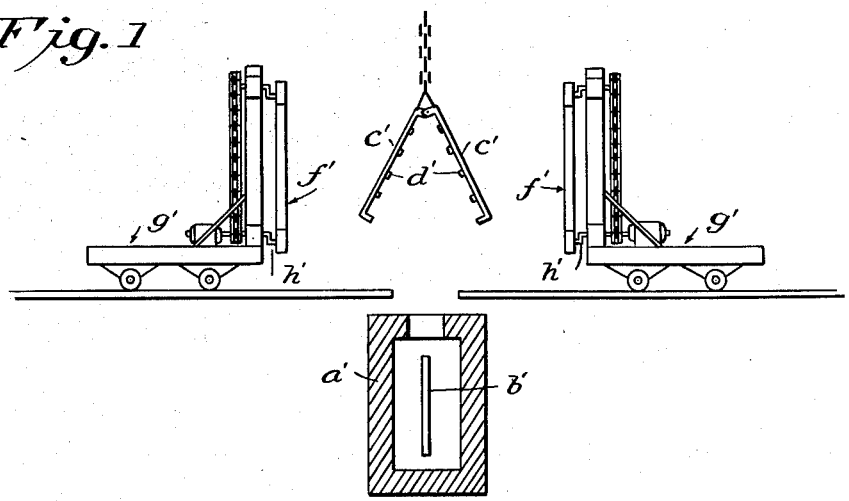
Figure 1 is a view illustrating the use of a frame or grating which carries the lugs to support the glass plate, the blowing or chilling devices being shown separated and in inoperative position.
Figure 2:
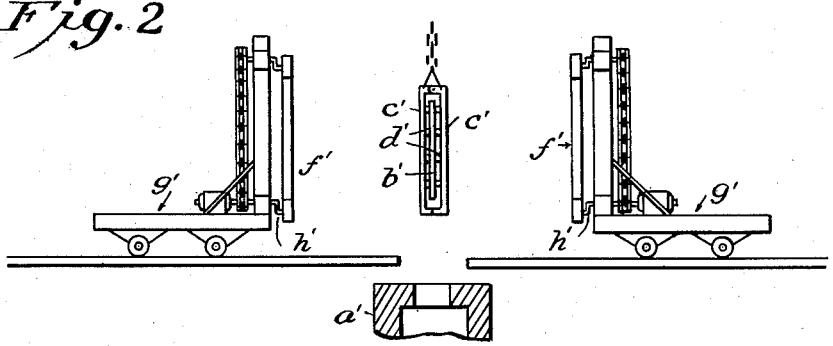
Figure 2 is a view similar to Figure 1, illustrating the sheet enclosed by the supporting frame.
Figure 3:
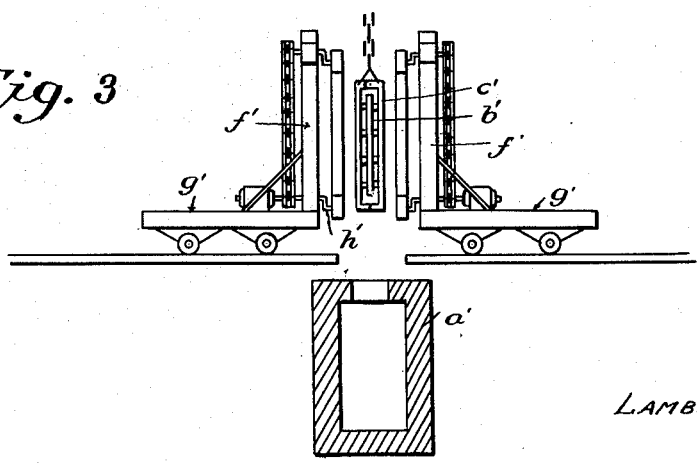
Figure 3 is a view showing the blowing members in blowing position.

In Figs. 1, 2 and 3 $a'$ designates the furnace for heating the glass plate $b'$. Two co-operating grates $c'$ are provided on the innersides with the stops or lugs $d'$. Two blower frames $f'$ are mounted on travelling members $g'$, and by means of which they can be moved to and fro horizontally. A further movement can be imparted to the blowing frames within their plane by the eccentric drive $h'$ or other suitable means connected to a motor. The glass plate $b'$ heated in the furnace $a'$ is lifted therefrom between the lug grates $c'$ and engaged and retained by the latter (Fig. 2). The blowing frames $f'$ are moved to the glass plate at the spacing desired, and the chilling thereupon effected (Fig. 3). As previously stated, the lug grates can also be inserted into the furnace for the purpose of heating the lugs and thereafter engaged with the glass plate and removed with it.

According to Figs. 4–6 the plate $b'$ (Fig. 4) heated in the furnace $a'$ can be carried from the furnace between the lug grates $c'$ (Fig. 5), or the latter are introduced into the furnace and therein engaged with the plate. The lug grates with the plate are then passed over the bath receptacle $i'$ and immersed in the liquid bath (Fig. 6) for chilling the plate. With the glass plate enclosed within the gratings the cooling liquid can be vigorously agitated without the danger of distorting or bending the plate, by the use of air-pressure jets $k$, as shown in Figure 15.

What is claimed is:

1. The method of producing a hardened glass object which consists in heating the object to approximately the softening point, thereafter rapidly chilling said object in a vertical position and supporting the object at a plurality of spaced points of small dimension throughout its area to prevent a substantial movement of the object during said heating and chilling.

2. The method of producing a hardened glass object which consists in heating the object to approximately the softening point, rapidly chilling opposite surfaces of said object by a liquid cooling medium in a state of vigorous agitation applied directly to said surfaces, and supporting during such chilling action by the liquid the object in a vertical position at a plurality of points throughout its area to prevent a substantial movement of the object during the chilling.

3. The method of producing a hardened glass object which consists in heating the object to approximately the softening point, supporting the object in a vertical position at a plurality of spaced points of small dimension throughout its area having a temperature substantially equal to that of the object to prevent a substantial movement of the object during said heating and applying a liquid cooling medium to the surface of the object while so supported to rapidly chill the same.

4. The method of producing a hardened glass object which consists in suspending the object from above in a vertical position, heating the object to approximately the softening point, rapidly chilling the object and supporting the object at a plurality of spaced points of small dimension throughout its area having a temperature substantially equal to that of the object to prevent a substantial movement of the object during said heating and chilling.

LAMBERT von REIS.